INVENTOR
C. S. FULLER
BY [signature]
ATTORNEY

METHOD OF FABRICATING SEMICONDUCTORS FOR SIGNAL TRANSLATING DEVICES

Filed Dec. 12, 1951

INVENTOR
C. S. FULLER
BY
ATTORNEY

FIG. 13A

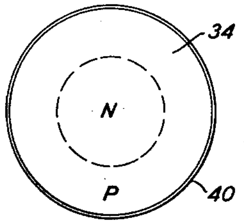

FIG. 13B

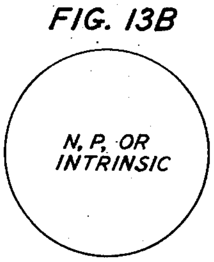

FIG. 17

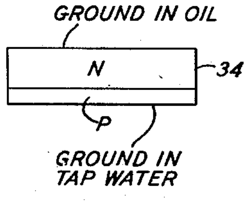

FIG. 14A

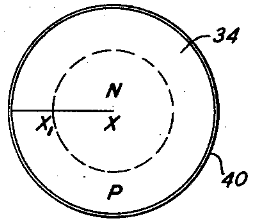

FIG. 14B

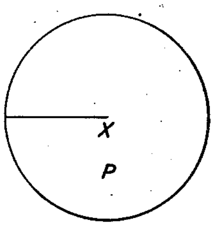

FIG. 18

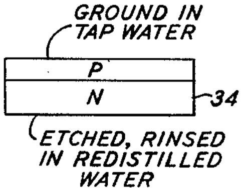

FIG. 15

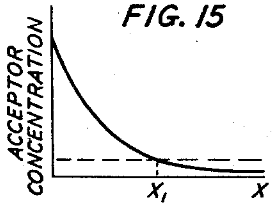

FIG. 16

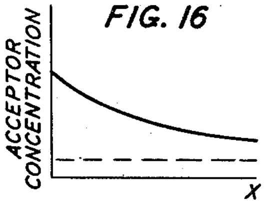

FIG. 19

ENTIRE SPECIMEN ETCHED, RINSED IN REDISTILLED WATER AND BLOTTED

FIG. 20

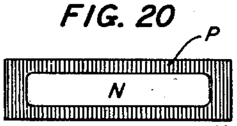

IMMERSED IN 0.03% FERRIC HYDROUS OXIDE SUSPENSION

FIG. 21

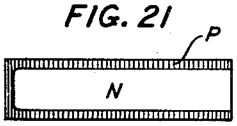

IMMERSED IN 0.03% COBALT HYDROUS OXIDE SUSPENSION, 120 SEC. TOTAL HEATING TIME

FIG. 22

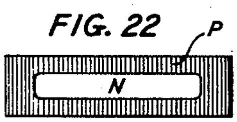

IMMERSED IN 0.03% COPPER HYDROUS OXIDE SUSPENSION, 180 SEC. TOTAL HEATING TIME

FIG. 23

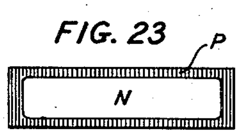

IMMERSED IN A SUSPENSION OF 0.1 GM. $WO_3$ IN 100 ML. WATER

FIG. 24

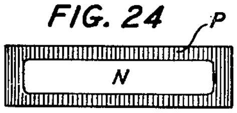

IMMERSED IN A SUSPENSION OF BiOCl (0.1 GM. IN 100 ML. WATER)

INVENTOR
C. S. FULLER
BY [signature]
ATTORNEY

United States Patent Office 2,771,382 Patented Nov. 20, 1956

2,771,382

METHOD OF FABRICATING SEMICONDUCTORS FOR SIGNAL TRANSLATING DEVICES

Calvin S. Fuller, Chatham, N. J., assignor to Bell Telephone Laboratories, Incorporated, New York, N. Y., a corporation of New York Application December 12, 1951, Serial No. 261,277

1 Claim. (Cl. 148—1.5)

This invention relates to the fabrication of semiconductors for signal translating devices and more particularly to methods for producing germanium bodies having PN junctions therein.

Germanium bodies having two or more contiguous portions of opposite conductivity types and defining PN junctions find application in a variety of signal translating devices, for example in rectifiers and detectors, such as disclosed in the application Serial No. 638,351, filed December 29, 1945, now Patent 2,602,211 granted July 8, 1952, of J. H. Scaff and H. C. Theuerer and in transistors, such as disclosed in Patents 2,502,488, granted April 4, 1950, and 2,569,347 granted September 25, 1951, to W. Shockley. Among the characteristics of junctions of particular moment from the standpoint of the performance of translating devices in which they are included are the impedance and the maximum reverse operating voltage. Also of importance are the uniformity of the junctions and the thickness of one or both of the contiguous zones or regions defining the junctions.

Junctions of the type here under discussion have been produced heretofore in several ways, for example by controlled addition of conductivity type determining impurities to a germanium melt or body, by segregation of such impurities as a result of graded or progressive cooling of a melt or by thermal conversion through prolonged heating of a body of one conductivity type. Illustrative of the first method mentioned is that disclosed in the application Serial No. 168,184, filed June 15, 1950, of G. K. Teal now Patent No. 2,727,840 granted December 20, 1955; illustrative of the second and third methods mentioned are those disclosed in the Scaff and Theuerer application above identified.

In general, the prior known methods are relatively time consuming and involve variables somewhat difficult to control. Further, such methods suffer from limitations from the standpoints of exact control of the junction characteristics and dimensions of the defining zones or regions. Also in the case of thermal conversion, generally the effect is homogeneous through the bulk of the body operated upon.

General objects of this invention are to expedite the fabrication of germanium PN junctions and to improve the physical and performance characteristics of such junctions.

More specific objects of the invention are to facilitate the fabrication of germanium PN junctions of a variety of prescribed forms and characteristics, to produce such junctions of high planarity, to enable controlled conversion to P-type of regions or layers of an N-type germanium body, to realize relative small capacitance for germanium junctions, to reduce the time requisite to produce germanium PN junctions, and to increase the maximum permissible reverse operating voltages for signal translating devices including two contiguous zones of opposite conductivity types.

One broad feature of this invention involves the controlled heat treatment of an N conductivity type germanium element to effect conversion of a surface region thereof to P conductivity type. This may be accomplished in a short time, say of the order of a few seconds to a minute, and further the thickness of the P region can be controlled precisely. The treatment may be made efficacious over one or more faces of a body or over only a restricted zone or zones of the body.

More specifically, in accordance with one feature of this invention, a PN germanium junction is produced by heating an N-type germanium element, for example in air or in an inert gas such as helium or argon, at a temperature in the conversion range, about 600° C. to 900° C., for a prescribed time dependent upon the temperature and upon the resistivity of the initial material, and then quenching the element, thereby to convert a surface layer of the element to P-type.

The time requisite to effect conversion to a prescribed depth is dependent also upon the prior thermal history of the element operated upon. As will be pointed out in more detail hereinafter, germanium material can be converted from N to P and back again one or more times without substantially altering the resistivity of the material. However, the effect of such repeated conversions is, in general, to reduce the carrier lifetimes for the material. In general, repeated conversions tend to increase the rapidity of controlled conversion in accordance with this invention.

In an illustrative case, a body, 0.1 centimeter thick, of N-type germanium of 20 ohm centimeter resistivity and about 70 micro-second lifetime is heated at about 800° C. for twenty-five seconds and then quenched whereby a P-type layer of approximately 0.040 centimeter thickness is produced on the body. The time given is the total heating time. For a specimen of the thickness noted about ten seconds is required to bring it to 790° C.; the net heating time at this temperature for the case presented is, then, fifteen seconds.

Another broad feature of this invention pertains to enhancement of surface layer conversion by thermal treatment in the manner referred to above, and more particularly to such enhancement in the case of initial germanium of low resistivity, say of the order of 5 ohm centimeter or less. More specifically, in accordance with this feature of this invention, prior to the controlled heat treatment briefly described above, one or more surfaces, or parts of these surfaces, are coated with an accelerator, advantageously a hydrous oxide, for example of copper, tungsten, bismuth or iron.

In one illustrative example embodying this feature, one surface of a 100 mil thick body of N-type germanium of 1 ohm centimeter resistivity and 70 microsecond lifetime has formed thereon a film of copper oxide, as by deposition from a colloidal solution, either with or without the use of applied electrical potential. The body is then subjected to heat treatment as above described, say at about 850° C. for about sixty seconds (total) and then quenched, whereby a layer of P-type germanium of about 35 mils thickness is formed at the surface covered by the film.

A further broad feature of this invention relates to inhibition or prevention of conversion of surfaces or surface regions of germanium elements subjected to controlled heat treatment as described hereinabove. More specifically, in accordance with this feature of the invention, a surface, or a portion thereof, of an N germanium body is plated with a metal capable of alloying with germanium below the range of conversion temperatures before the body is subjected to controlled heat treatment. Illustrative of the metals which may be utilized are silver, gold, gallium, indium, tin, zinc and antimony. Such plating, alloyed with the germanium, prevents thermal conversion of the regions or zones of the body masked thereby. In another specific illustrative embodiment involving the board feature here noted, a surface, or a portion thereof, is subjected to a treatment, such as grinding or etching, effective to remove the surface or portion and the body is then subjected to controlled heat treatment as has been described.

In an illustrative case embodying this feature, the faces bounding one end portion of a filament of N-type germanium of 10 ohm centimeter resistivity and 70 microsecond lifetime and 40 mils on a side are plated with gold, one-tenth mil thick, and the filament is heated at about 400–500° C. for about fifteen seconds to alloy the gold with the germanium. Then the filament is heated at about 750° C. for about forty seconds (net) in helium or nitrogen and quenched. The plated end portion remains N-type but the unplated portion is converted to P-type.

Understanding of the invention and appreciation of the various features thereof may be facilitated by a brief review of some known factors and a discussion of some basic principles pertinent to semiconductors, such as germanium processed in accordance with the invention. Germanium, in the form commonly employed at present in signal translating devices, is an extrinsic or impurity type semiconductor. The conductivity is attributable to the presence, in the germanium material, of significant impurities, which are classified as acceptors or donors, acceptors tending to make the material of P conductivity type and donors tending to make it of N conductivity type. The conductivity of the material is roughly proportional to the quantity of the significant impurities present and the quantity involved is exceedingly small, of the order of one ten-thousandth to one millionth of one percent.

As disclosed in detail in the application of Scaff and Theuerer identified hereinabove, germanium material of either conductivity type can be converted to the opposite conductivity type by appropriate heat treatment, the processes being reversible. Specifically, a body of P-type germanium may be converted entirely to N-type by prolonged heating at about 500° C., the conversion being homogeneous through the body. Also a body of N-type germanium may be converted to P-type by prolonged heating at a temperature in the range of about 600° C. to 900° C., which range is referred to hereinafter as the conversion range.

Because of the minute quantities of impurities involved, the precise mechanism involved in and responsible for the conversion is not now known. However, the effects are consistent with the hypothesis of an alteration in the acceptor concentration in the material. Further, it has been determined that repeated conversions of conductivity type, say from N to P and then back to N can be effected without substantial difference between the resistivities of the initial and final materials, but that the heat treatment of the material does alter, specifically decreases, the carrier life-times, hole and electron, therefor.

It has been determined also that the temperature requisite to convert a specimen of N conductivity type germanium to P-type is dependent upon its resistivity. For example, in typical cases germanium of about 20 ohm centimeter resistivity can be converted readily at about 600° C. whereas one having a resistivity of about 0.4 ohm centimeter requires heating at about 900° C. Further, it has been found that in some cases, notably for low resistivity, say less than about 5 ohm centimeter, N-type germanium, conversion cannot be effected even by heating at 900° C.

The present invention, in one of its broad aspects, enables conversion of an N-type germanium body of substantially any resistivity, partly or wholly to P-type and further provides control of the conversion, as by acceleration or inhibition of such effect at one or more surfaces, or portion or regions of these surfaces, of the body whereby P layers or zones, of prescribed thickness and configuration, may be produced in an N-type germanium element.

The invention and the above-noted and other features thereof will be understood more clearly and fully from the following detailed description with reference to the accompanying drawing in which.

Figure 6A:
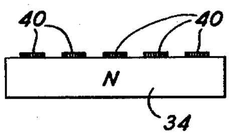
Figure 6B:
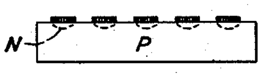
Figure 6C:
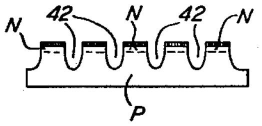
Figure 7A:
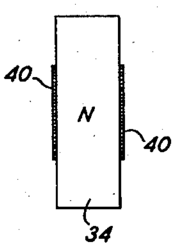
Figure 7B:
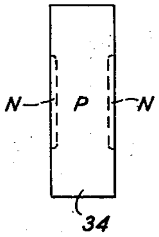
Figure 8A:
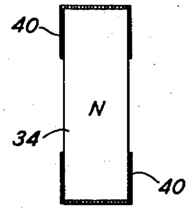
Figure 8B:
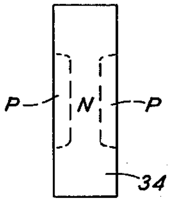

Figs. 4A to 4D portray steps in the fabrication of a PN junction germanium diode illustrative of one embodiment of this invention;

Figs. 5A to 5D illustrate the fabrication of a large area junction diode in accordance with another embodiment of this invention;

Figs. 6A to 6C depict another embodiment of this invention wherein discrete zones or regions at one face of a germanium body are converted in conductivity type;

Figs. 7A and 7B illustrate the fabrication of a germanium body of NPN configuration in accordance with this invention;

Figs. 8A and 8B illustrate the fabrication of a germanium body of PNP configuration in accordance with this invention;

Figs. 9, 10, 11 and 12 are diagrams illustrating several forms of germanium bodies containing PN junctions which may be produced in accordance with the methods of this invention;

Figs. 13A, 13B, 14A and 14B show another application of methods in accordance with this invention for producing prescribed acceptor gradients in spherical semiconductive bodies;

Figs. 15 and 16 are graphs illustrating acceptor gradients in typical devices constructed in accordance with this invention;

Figs. 17 and 18 are diagrams illustrating the effect of certain surface treatments upon semiconductive bodies subjected to controlled thermal conversion in accordance with this invention; and Figs. 19 to 24 inclusive illustrate diagrammatically the effects of various other surface treatments upon N-type germanium bodies subjected to controlled thermal conversion in accordance with this invention.

Figure 1:
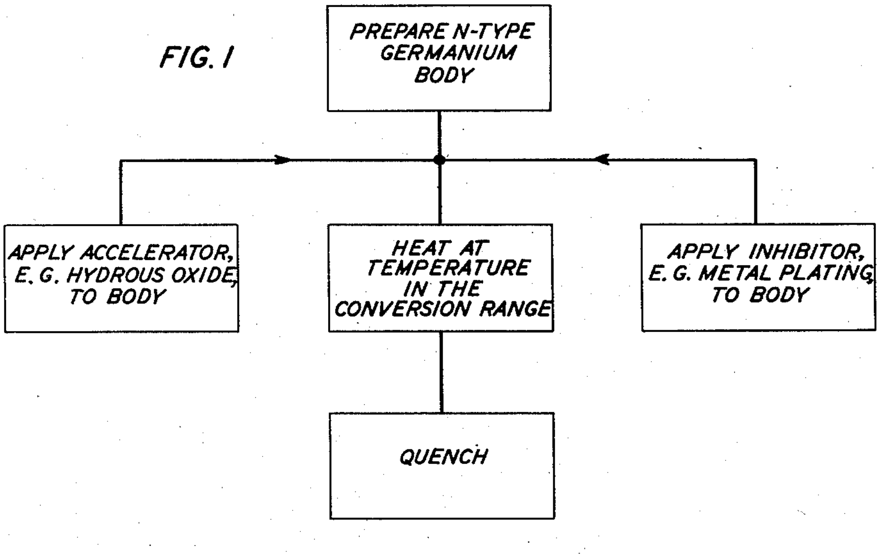
Fig. 1 is a block diagram illustrating steps involved in the fabrication of semiconductor bodies in accordance with the methods of this invention.

Referring now to the drawing, as indicated in Fig. 1 the method of fabricating germanium bodies for signal translating devices comprises, in sequence, preparation of the body, heating in the conversion range and quenching. The body may be a wafer, disc or filament of N-type germanium obtained from an ingot produced as disclosed in the application of Scaff and Theuerer identified hereinbefore or from a single crystal produced as disclosed in the application Serial No. 138,354, filed January 13, 1950, of J. B. Little and G. K. Teal, now Patent 2,683,676, granted July 13, 1954.

The preparation of the body, be it wafer, disc, filament or other form, may include an initial heating, say from about one hour to about 24 hours at 500° C. in air or an inert atmosphere, for example helium or argon, to substantially remove natural acceptor centers from the bulk of the material. Such preliminary heating is particularly advantageous when the prior history of the body is unknown, in order to assure a substantially homogeneous N-type structure. The body preparation advantageously includes also cleansing and light polishing of the surface or surfaces at which the inversion in conductivity type is desired. This may be effected by light grinding with say 600 mesh aluminum oxide known commercially as Aloxite, in water and etching, for example with an etchant, hereinafter referred to as CP–4, composed of 15 parts acetic acid, 25 parts nitric acid, 1 part of liquid bromine and 15 parts of 48 percent hydrofluoric acid, followed by rinsing in water. Other inert abrasives, for example silicon carbide or diamond dust, also may be used.

Figures 2, 3:
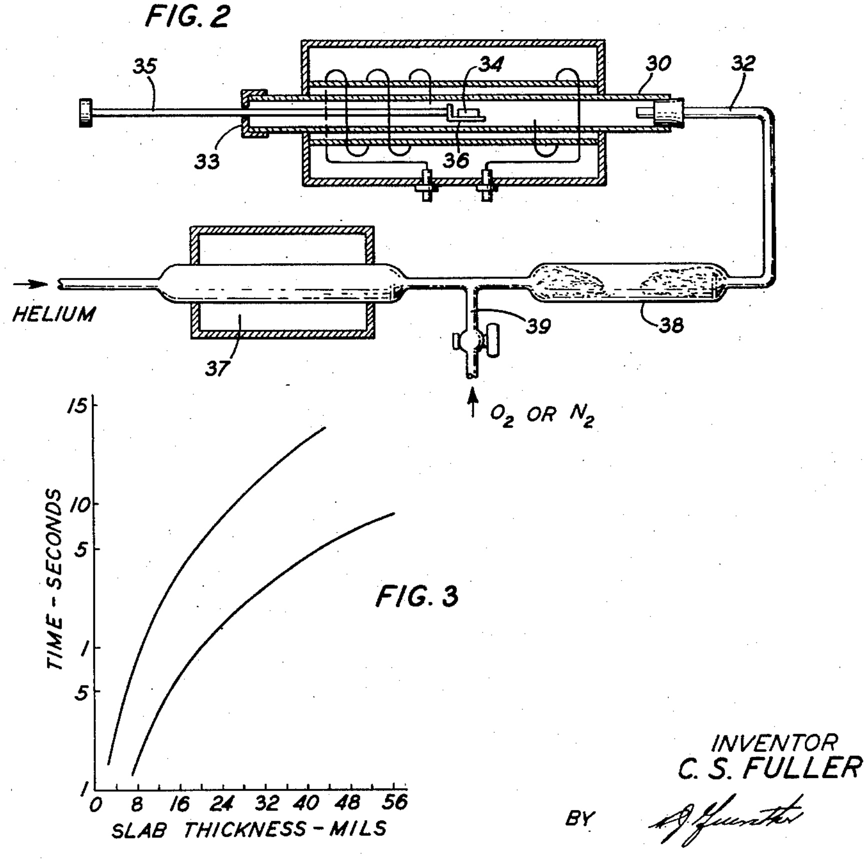
Fig. 2 is a diagram of typical apparatus which may be employed in practicing this invention.
Fig. 3 is a graph illustrating the relation between certain parameters of moment in effecting conversion of N-type germanium to P-type germanium.

The prepared N-type germanium body is then heated rapidly to a temperature in the conversion range either in air or an inert atmosphere such as argon or helium. The heating may be effected in apparatus, illustrated in Fig. 2 comprising a quartz tube 30 encompassed by a jacketed resistance type heater 31 and having a port 32 at one end and an apertured cover 33 at the other. The body to be treated, indicated at 34, may be introduced into the tube 30 through the agency of a rod 35 having a support or holder 36, for example of mica or quartz, at one end. The desired gas, for example helium as indicated in Fig. 2, is introduced into the furnace by way of the port 32 and passed therethrough during the heating period. If desired, the gas may be freed of oxygen by passing it over heated reduced copper gauze in the heater indicated at 37 and dried as by passing it over phosphorous pentoxide or liquid nitrogen in the chamber indicated at 38. Also, if desired, oxygen, nitrogen or other gas may be introduced by way of an inlet 39.

In the heating step, the body 34 may be left at a relatively cool portion of the furnace for a short time to allow removal of the air by the helium. For example it may be introduced to position A in Fig. 2 at which the temperature is about 200° C. and left at this position for about five minutes. Thereupon it is inserted further to position B at which the temperature is in the conversion range.

After being heated at a temperature and for a time which will be discussed in detail presently, the germanium body is quenched. This may be accomplished by moving the body to position A, holding it there for about ten to twenty seconds and then withdrawing it from the furnace.

The heating and quenching steps may be accomplished in other ways. For example, the heating may be effected by directing a flame at the body, by placing a heater filament in proximity thereto, by high frequency induction, or by passing a suitable current through the body, and the quenching may be done by placing the heated body in contact with a cool, large volume metal block. Irrespective of the particular heating and quenching method, the effect thereof is to convert a surface layer of the N-type germanium body to P-type. However, the thickness of this layer is dependent upon a number of factors in ways which will be understood from the following examples and considerations.

The conversion, it has been determined, proceeds inwardly from the surface of the N-type body. The rate of progression inwardly of the PN junction produced is dependent upon the resistivity of the initial material, generally increasing as the resistivity decreases. Also, this rate is dependent upon the prior thermal history of the body. Specifically, if the body has been subjected to several conversions by heat treatment as discussed hereinabove, the rate of progression of the junction is greater than for the case of N germanium which has not been subjected to such treatment. For a sample of unknown origin or prior thermal history, the characteristics of moment for purposes of conversion in accordance with this invention can be determined by measuring the carrier lifetimes therefor, in ways now known in the art. Repeated conversions progressively decrease these lifetimes so that the lifetime indicates the prior thermal history of a given body. For most practical purposes, material exhibiting carrier lifetimes of 70 microseconds or higher are desirable and such are utilized advantageously in the practice of this invention.

The thickness of the P layer produced in accordance with this invention is dependent upon both the time and the temperature of the heating step, the thickness increasing substantially linearly with the square root of time and increasing also with temperature. For N-type germanium of resistivity between about 10 and 20 ohm centimeter and having carrier lifetime of 70 microseconds or longer, and a P layer thickness of 20 mils the conversion proceeds inwardly at an average rate of substantially one mil per second, for a heating temperature of 800° C. For similar material, this rate is one-half mil per second at a temperature of 600° C. and three mils per second at a temperature of 900° C. The relations for another specific material, namely a slab of 2 ohm centimeter N-type germanium rinsed in tap water, are illustrated in Fig. 3 wherein the abscissae are slab thickness and the ordinates are timed in seconds requisite to convert the slab to 2 ohm centimeter P-type material at the center, the two curves being for heating temperatures of 750° C. and 850° C. as indicated thereon.

Several specific examples will illustrate the relationship among the parameters involved in the thermal conversion of N-type germanium to P-type. In one, a body of 20 ohm centimeter N-type germanium, produced in the manner disclosed in the Scaff-Theuerer application identified hereinabove, was annealed in air at 650° C. and cooled to 400° C. over a period of one hour. A disc, 2 centimeters in diameter and one millimeter thick, was cut from this body and the faces of the disc ground to a matte finish with 600 mesh Aloxite in distilled water. The disc then was placed in CP–4 etchant for 30 seconds, rinsed in distilled water and dried. It was heated by dropping it onto an oxidized nickel sheet heated to 750° C. in a gas air flame, whereby the disc rose to a temperature of 750° C. in two seconds. Following heating at the temperature for 5 seconds, the germanium element was quenched by transferring it to a large steel block at room temperature. Examination showed that the surface layers had been converted to P-type thereby forming on the disc two PN junctions 0.8 millimeter apart.

In another example, a disc of N germanium, one-eighth inch thick, and of 8 ohm centimeter resistivity, produced and prepared as in the first example given above was heated to approximately 900° C. in an air furnace for 30 seconds and quenched by contacting it to a steel block. The inner third remained N-type but the other parts were converted to P-type.

In a third example, an N germanium specimen of 5 ohm centimeter resistivity and 0.15 centimeter thick, produced and prepared as in the first example, was heated in helium at 800° C. for 15 seconds whereby P layers 0.5 millimeter thick were produced on opposite faces of the specimen.

In still another example, a 0.1 centimeter thick wafer of single crystal germanium produced as disclosed in the Little-Teal application identified hereinabove and having a resistivity of 20 ohm centimeter and about 70 microsecond lifetime was employed. It was placed at position A (about 200° C.) in the furnace of Fig. 2, allowed to remain there for 120 seconds and then moved to position B (about 800° C.). Helium was passed through the furnace throughout the treatment. The wafer rose to temperature (800° C.) in about 10 seconds, was maintained at this temperature for 8 seconds, then returned to position A for 5 seconds, and finally removed from the furnace. This treatment resulted in formation of P layers 0.037 centimeter thick on opposite faces of the wafer.

The foregoing description has dealt primarily with one broad aspect of this invention, to wit the conversion of surface layers of an N-type germanium body to P-type by controlled heat treatment. As indicated on Fig. 1, the method may include also, prior to the heating step, treatment of the body to inhibit or accelerate the conversion; such treatment is applicable to entire surfaces of the body and to a portion or portions of one or more surfaces.

In general, in one embodiment, the inhibiting treatment comprises applying to a surface, or a portion or portions thereof, of the germanium element, a layer of a metal which alloys with germanium, advantageously one which so alloys at a temperature below the conversion range. Illustrative of the metals which may be utilized are gold, silver, zinc, tin, indium, gallium, antimony. The germanium element with the metal thereon is heated to alloy the metal with the germanium and is then subjected to heating and quenching as described heretofore. The portions of the body masked by the metal are substantially unaffected by the heating and quenching, remaining N-type, whereas the unmasked portions are converted to P-type.

One specific example of treatment involving inhibition of conversion has been given heretofore.

As another example illustrative of this feature, a piece of N-type germanium was cut from a single crystal produced in the manner disclosed in the Little-Teal application heretofore identified, the wafer having a resistivity of about 25 ohm centimeter and a lifetime of 180 microseconds. All surfaces of the germanium were ground to a matte finish with Aloxite and water and then etched for two minutes in superoxol. Superoxol comprises 5 parts by volume of 48 percent hydrofluoric acid, 5 parts 30 percent hydrogen peroxide and 20 parts water. Next the germanium was plated with gold to a thickness of 0.2 mil, the plating was removed from one surface and the element was heated at 500° C. for about 20 seconds in helium to alloy the gold with the germanium. The exposed, i. e. unplated face was ground down approximately 2 mils with Aloxite in water, washed in distilled water and dried. Then the germanium was heated in helium at 822° C. for 90 seconds total and quenched on a steel block whereby it was brought to room temperature in about 7 seconds. This produced a layer of about 1.8 millimeter thickness of P-type at the unplated face whereas the material adjacent the opposite face, i. e. the gold plated one, remained N-type.

As a further example, a strip of single crystal N-type germanium of 9 ohm centimeter resistivity and 40 mils thick was ground flat on opposite faces with Aloxite and distilled water and immersed to one-half its length in a silver-sodium cyanide electroplating bath containing 35 grams of silver per liter. The strip in series with a resistance of 500 ohms was held at about 45 volts for about 15 seconds whereby a film of silver, about 0.1 mil thick, was plated onto the immersed portion. The specimen was washed in distilled water and dried. Next the strip was placed at position A in the furnace of Fig. 2 (temperature=200° C.) and held there for 5 minutes, helium being passed through the furnace. With the helium flow continuing, the strip was moved to position B (temperature=820° C.) and there held for about 30 seconds, approximately 10 seconds being required for the strip to heat to temperature. Finally, it was moved to position A for about 60 seconds and then removed from the furnace. As a result of the heating and cooling the half of the body not masked by the silver plating was converted to P-type whereas the masked half remained N-type.

As another example, a slice of single crystal N-type 10 ohm centimeter germanium 0.10 centimeter thick was cut from a rod 1 centimeter in diameter prepared by the Teal-Little process. After grinding the surfaces off 2 mils on No. 400 Aloxite waterproof abrasive paper using water as a lubricant the surfaces were etched in superoxol etchant for 10 seconds, rinsed with distilled water and plated with 0.1 mil of tin in an acid tin bath. One face of the sample was exposed by grinding off the tin with No. 600 Aloxite in water and thoroughly rinsing under running distilled water. The sample was heated directly in air for 10 seconds at 750° C. A PN boundary was found 0.020 millimeter deep parallel to the large area faces and adjacent the exposed face when 0.050 millimeter of germanium was ground from the edges and the latter etched.

It has been found that masking of a surface or portion thereof of the N germanium body with metal coatings in the manner described hereinabove not only inhibits conductivity type conversion of the masked body portion by heat treatment but also prevents deterioration of the carrier lifetimes in this portion by such treatment.

The controlled thermal conversion of surface zones or regions of N-type germanium elements may be utilized to produce a variety of forms of semiconductor signal translating devices, some of which are illustrated in Figs. 4 to 12, inclusive.

Figure 4A:
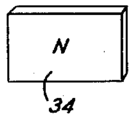
Figure 4B:
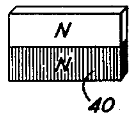
Figure 4C:
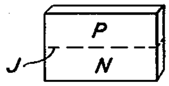
Figure 4D:
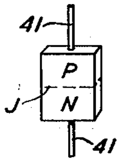

Figs. 4A to 4B depict the steps in the fabrication of a junction diode suitable for use as a rectifier or detector. As indicated in Fig. 4A, a slab 34 of N-type germanium is prepared as in the manners described heretofore, and as shown in Fig. 4B approximately one-half of the slab is plated with a suitable metal 40. Thereafter the plated slab is subjected to controlled heat treatment and quenching. The one half of the slab masked by the metal plating remains N-type but the unmasked portion is converted to P-type as indicated in Fig. 4C. Appropriate leads 41 are then connected to the P and N zones of the slab 34, for example by plating the faces of the body 34 with copper and soldering suitable wires thereto.

Figure 5A:
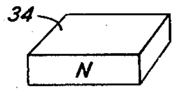
Figure 5B:
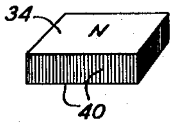
Figure 5C:
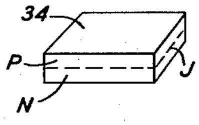
Figure 5D:
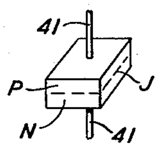

In the fabrication of the embodiments shown in Figs. 5A to 5B, the steps sequentially are similar to those in the fabrication of the diodes in Fig. 4. Specifically, the slab 34 of N-type germanium is prepared and one major face thereof is plate with a film of metal 40. Then the plated slab is subjected to controlled heat treatment and quenched. The portion of the slab adjacent the plating 40 remains N-type whereas the remainder converts to P-type as illustrated in Fig. 5C. It will be understood, of course, that the location of the P–N junction J can be determined by controlling the temperature and time of the heat treatment thereby to control the thickness of the layer converted to P-type. Suitable connections 41 are made to the P and N zones as in the manner described heretofore, as shown in Fig. 4D.

In another embodiment shown in Figs. 6A and 6B, restricted areas of one face of an N germanium wafer 34 have applied thereto a film of metal 40. The combination is heated and quenched whereby, as illustrated in Fig. 6B, all of the wafer except the zones or regions immediately below the metal platings is converted to P-type. Portions of the bulk material between the P zones may be etched away, as indicated at 42, to form a series of N-type islands on the P-type body.

A germanium body of NPN configuration may be fabricated in accordance with the invention in the manner illustrated in Figs. 7A and 7B. Specifically, layers of a metal are applied to limited areas of opposite major faces of an N-type germanium wafer 34 as indicated in Fig. 7A and the assembly is then heated and quenched whereby the bulk of the body is converted to P-type, but regions immediately adjacent the metal layers 40 remain N-type thereby defining an NPN structure as shown in Fig. 7B.

Germanium bodies of PNP configuration also may be produced in accordance with the methods of this invention. As illustrated in Fig. 8A, suitable metal platings are provided over opposite end portions of the N-type germanium body 34. Heating and quenching in the manners heretofore described results in the conversion of surface portions intermediate the coatings 40 to P-type whereas the remainder of the material remains N-type. Thus, as portrayed in Fig. 8B, a body of PNP configuration is realized.

Figure 9:
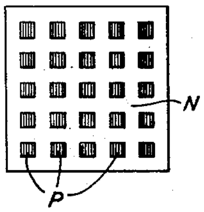

Arrays of PN junctions also can be produced in accordance with the methods of this invention by appropriate masking by the use of metal platings as abovedescribed. For example as depicted in Fig. 9, a plurality of rectangular zones at one face of an N-type body may be masked whereby following heat treatment and quenching a checkerboard array of N zones on a P-type body is obtained. Conversely, an array of P zones on an N-type body of the form illustrated in Fig. 9 may be produced by utilizing a grid form of plating upon one face of the body.

Figure 10:
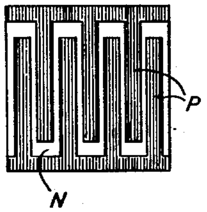

As another example, depicted in Fig. 10, a combed array of alternate N and P zones may be produced by utilizing masking metal platings of the configuration of the desired zones.

Figure 11:
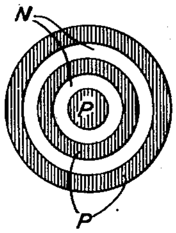

Also as illustrated in Fig. 11, a plurality of concentric alternately arranged N and P zones may be produced through the use of annular masking coatings on one face of an N-type germanium body.

Figure 12:
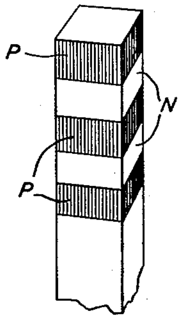

As portrayed in Fig. 12, the invention may be utilized also in the fabrication of a rod, which may be of square section as shown or other sections such as circular, having alternate zones thereof of opposite conductivity types. These zones are realized by appropriate masking, heating, and quenching in the manners described hereinabove.

For low resistivity N-type germanium material, specifically such material of or less than about 5 ohm centimeter resistivity, the thermal conversion of surfaces or zones to P-type may be inhibited or prevented also in other ways. These entail in general thorough cleansing the surface or portion thereof which it is desired to maintain P-type and maintaining the cleansed condition prior to and during the controlled heat treatment of the specimen.

Several typical examples will serve to illustrate the manner of cleansing by which the inhibition or prevention of conversion of N-type germanium to P may be effected. In one example one face of single crystal N germanium wafer of about 5 ohm centimeter resistivity was ground with 600-mesh Aloxite under dry mineral oil at 60° C. and the specimen, still wet with oil, was introduced into the furnace depicted in Fig. 2 and heated at 800° C. for 60 seconds. The grinding under oil had removed approximately 0.5 mil from one surface of the wafer. Heating of the specimen in the manner recited and quenching resulted in no thermal conversion of the body material at or adjacent the surface which had been ground under oil whereas the opposite face layer thereof converted readily to P-type. A similar specimen but having a resistivity of 13 ohm centimeters ground, heated, and quenched in the identical manner showed conversion to P-type of layers at all surfaces. Similar results have been realized also with polycrystalline as well as single crystal material.

In another example, a single crystal of 1.2 ohm centimeter resistivity had all its faces ground under oil in the manner specified above; heating it at about 800° C. for 90 seconds followed by quenching, effected no conversion to P-type of any of the wafers.

In another illustrative example, a wafer of polycrystalline N germanium having a resistivity of 5 ohm centimeter had one face etched for 45 seconds in CP–4 and rinsed in redistilled water, that is distilled water which had been redistilled in quartz. Heating of this specimen at 800° C. for 50 seconds resulted in no thermal conversion adjacent the etched surface whereas such conversion proceeded inwardly readily from the unetched opposite face.

As still another example, a disc of N germanium having a resistivity of 1 ohm centimeter had all its surfaces etched in CP–4 for 45 seconds followed by rinsing in redistilled water. Heating of the specimen at 800° C. for 60 seconds resulted in no thermal conversion to P-type of any portion of the element.

In all these examples the heating was effected in an oxygen-free atmosphere.

Similar results to those obtained by grinding under oil may be realized by grinding dry with a clean abrasive such as diamond dust or silicon carbide, or by sand blasting.

Typical germanium bodies produced in accordance with this invention and involving inhibition of thermal conversion are illustrated in Figs. 17 and 18. In the former figure, the upper face of the N germanium wafer was ground under oil as described above whereas the lower face was ground in tap water. Controlled heat treating followed by quenching resulted in conversion of a layer adjacent the lower face as indicated.

For the example depicted in Fig. 18, the upper surface of the N germanium wafer 34 was ground in tap water and the lower face etched in CP4 and rinsed in redistilled water. Controlled heating followed by quenching resulted in conversion of the upper surface layer to P-type as shown.

Further, as has been noted hereinabove, a feature of this invention pertains to enhancement or acceleration of the thermal conversion of N germanium to P-type. In general, this feature entails treatment of a surface, or portion thereof, of an N body with a metal compound including oxygen. Illustrative of the compounds which have been found efficacious are copper oxide (CuO), tungsten oxide ($WO_3$), cobalt oxide, bismuth oxychloride (BiOCl) and iron oxide ($Fe_2O_3$). When first applied from aqueous media these oxides are associated with water, i. e. hydrous oxides. Such compounds are effective in accelerating thermal conversion in both high and low resistivity germanium, say covering the range of resistivities from 0.2 ohm centimeter to 20 ohm centimeter and higher.

The effects of several of these compounds upon thermal conversion are illustrated in Figs. 19 and 24. These figures are to the same scale and for essentially alike initial material, namely a 1 ohm centimeter resistivity single crystal germanium wafer 0.1 centimeter thick. For all cases, the heat treatment was at 800° C. in apparatus of the construction shown in Fig. 2 and wherein a flow of helium, oxygen free, of 500 milliliters per minute was maintained during the heating. The heat treatment involved preheating at position A (200° C.) for about three minutes, heating at position B (800° C.) for 60 seconds in the cases of Figs. 19, 20, 23 and 24, 120 seconds in the case of Fig. 21 and 180 seconds in the case of Fig. 22, followed by quenching to room temperature. Also in all cases the specimen was etched in CP–4 and rinsed in redistilled water prior to the surface and the heating treatments.

In the figures noted, the shaded areas are of P-type and the unshaded of N-type.

It will be noted that for the case depicted in Fig. 19, heating and quenching effected no conversion of any of the body to P-type whereas in each of the other cases, Figs. 20 to 24, involving application of hydrous oxides to the specimen conversion to P-type of surface portions of the wafer was obtained. The effect is particularly notable in the case of copper oxide as will be discussed presently. In the case of cobalt oxide, Fig. 21, the effect is relatively slight, it having been found that for a total heating time of 60 seconds substantially no conversion to P-type occurred.

As indicated above, copper oxide has been found to be particularly efficacious as a conversion accelerator, this being true of both the dry and the hydrous oxides. One illustrative case involving a colloidally deposited film of copper oxide on a 100 mil thick, 1 ohm centimeter resistivity N germanium body has been described priorly herein. In another illustrative example, one face of an N germanium wafer, 100 mils thick, of 4.0 ohm centimeter resistivity was dusted with dry copper oxide and the wafer then heated at 795° C. for 60 seconds in helium and quenched in the manner heretofore described. It was found that at the oxide dusted face, a 43 mil layer was converted to P-type whereas at the opposite undusted no P layer was formed.

The copper oxide film can be produced in several ways. For example, a suitable colloidal solution may be prepared by dissolving 0.1 gram of copper sulphate in 100 milliliters of pure water, adding 0.1 gram of concentrated ammonia water and boiling. A 0.05 percent solution of copper nitrate in water also has been found effective. Further, the film may be formed by evaporating or plating copper onto the germanium element and allowing it to oxidize. Similar processes may be utilized for the other metal oxides.

As an example, a slice of N-type germanium 0.075 centimeter thick was cut from a single crystal (1.2 centimeter diameter rod) made according to the method of Teal and Little and having a resistivity of 10 ohm centimeter and lifetime of 150 microseconds. The surfaces were ground down approximately 2 mils on No. 280 waterproof Aloxite paper using water as a lubricant and finished by grinding in No. 600 Aloxite powder and water. After washing and blotting dry, the wafer was immersed for five minutes in a solution prepared by adding 5 cc. of 0.1 percent ammonia water to 500 cc. of warm 0.05 percent copper sulphate solution in distilled water and stirring. The wafer was blotted dry with filter paper, heated for five seconds at 750° C. in air and quenched by sliding onto a cold metal block. PN junctions were found 0.0125 in from the surfaces upon removal of 10 mils of material from the edges of the slice and etching.

As another example, a similar slice of N-type single crystal germanium (1.5 centimeter diameter rod) to that employed in example (*a*) but of 25 ohm centimeter resistivity was prepared by grinding to 0.1 centimeter thickness as previously described. The slice was etched for fifteen seconds in a mixture of 5 parts 30 percent hydrogen peroxide, 5 parts 48 percent hydrofluoric acid and 20 parts of distilled water. It was then treated with copper hydrous oxide sol as described in (*a*) blotted dry and heated at 600° C. in helium for 30 seconds. PN boundaries were found 0.025 millimeter depth from the longer area faces upon removing 0.05 millimeter germanium from the edge of the slice and etching.

It will be appreciated that the invention enables fabrication of germanium bodies of a variety of configurations and having one or more PN junctions therein and also enables attainment of such bodies wherein the thicknesses of the several zones, N or P or both, can be controlled with a high degree of accuracy. The methods are characterized, generally, by facility of operation and rapidity of treatment so that they are adapted eminently for mass production of junction type bodies for semiconductor signal translating devices.

PN junctions produced in accordance with this invention, further, have several highly advantageous properties. Among these are the uniformity and high planarity obtainable for the junction. Also such junctions exhibit a relatively low capacitance in comparison to junctions produced in other ways. Further, PN junctions produced in accordance with this invention are capable of withstanding unusually high reverse operating voltages, of the order of 1000 to 2000 volts in typical devices.

Although the invention is not to be limited thereby, the following theoretical consideration is enlightening and consistent with the results which have been obtained. N-type germanium material having resistivities from say a small fraction of one ohm centimeter to say 30 centimeters can be assumed to contain traces of both donor and acceptor impurities, the donors being in excess and accounting for the N-type conductivity. In general, the smaller the impurity content, the greater is the resistivity of the material. For example, it has been generally accepted that in N-type material of 20 ohm centimeter resistivity the excess donor concentration is about $8.7\times10^{13}$ per cm.$^3$, whereas for such material of 3 ohm centimeter, the excess donor concentration is about $5.8\times10^{14}$ per cm.$^3$. Conversion of N-type material to P-type entails a reversal in the sign of the impurities in effective excess. That is to say, N-type material, in which the donors are in effective excess, can be converted to P-type by adding acceptors to the material until they are in effective excess of the donors.

Inasmuch as it has been found that when specimens of N material are heat treated in accordance with this invention the conversion to P-type progresses inwardly from the surface, it is reasonable to postulate that the conversion is attributable to the presence of a significant impurity, capable of acting as an acceptor, and diffusion of this impurity into the body as a result of the heat treatment. Inasmuch as, as has been indicated hereinabove, relatively high resistivity materials convert readily when subjected to controlled heat treatment in accordance with this invention, whereas this is not the case for low resistivity, 5 ohm centimeter or less, materials without treatment by accelerators, it may be postulated that in the high resistivity materials sufficient acceptor impurity or impurity capable of acting as an acceptor is present at the surface to satisfy at least the minimum requirement to neutralize approximately $3.5\times10^{14}$ donors per cubic centimeter.

The action of both inhibiting and accelerating treatments is consonant with this hypothesis. Specifically, the inhibiting treatments involve removal of surface impurities and hence substantially denude the surface of acceptors, acceptor like or acceptor inducing elements. Conversely, the accelerating treatments increase the surface concentration of acceptor or acceptor like elements and thus enhance the conversion as a result of the controlled heat treatment.

Because of the extremely small quantity of impurities requisite to effect conversion from N- to P-type, the precise agent effective in the conversion process has not been identified. However, the results obtained are consistent with the supposition that oxygen is the element of particular significance and that the effect of the oxide surface coatings is to facilitate the diffusion of oxygen atoms or ions into the germanium as acceptors. Theoretical considerations indicate that for materials of the resistivities herein mentioned, the number of oxygen atoms or ions requisite is approximately $0.08\times10^{15}$ to $8.0\times10^{15}$ per cubic centimeter, the exact quantity depending upon the resistivity of the initial material. Thus, if it is assumed that following an Aloxite grinding and etching surface treatment as described hereinabove, the acceptors left on the surface are about $3\times10^{13}$ per square centimeter it can be demonstrated that for specimens of appropriate volumes, like those utilized in specific examples given heretofore, the number of acceptors present would be just insufficient to allow conversion of 5 ohm centimeter material.

Whatever the full explanation of the actions involved may be, the methods of this invention are fully efficacious and highly advantageous in enabling the controlled conversion of surfaces or zones of N-type germanium to P-type thereby to produce PN junctions having characteristics eminently suitable for utilization in signal translating devices.

The invention may be utilized also to produce a desired distribution of donor and acceptor concentrations in a germanium body, as illustrated in Figs. 13 to 16. For example, as illustrated in Figs. 13A and 13B, a sphere 34 of N-type germanium of uniform conductivity, say about 0.1 ohm$^{-1}$ cm., throughout may be heated, say at 800° C., for a time to convert an outer shell portion thereof to P-type. Thereafter the sphere is coated with a masking metal 40 and again heated at about 800° C. to effect a homogeneous distribution of acceptors and donors. For a sphere of one-sixteenth inch diameter, further heating for about five minutes in helium would suffice for this purpose. If the number of acceptors introduced before the masking is sufficiently great, the material of the final sphere will be homogeneously P-type; if the number is smaller than the initial donor concentration, the final sphere will be of N-type but of resistivity higher than that of the initial material. If the number of acceptors introduced is substantially equal to the donors in the initial material, then the final sphere will be of substantially intrinsic conductivity.

Also, in accordance with the methods of this invention, a desired acceptor gradient concentration may be produced within a body. The sphere 34 may be heated for a time at about 800° C. whereby as illustrated in Fig. 14A a shell portion thereof is converted to P-type. Thereafter, a metal masking coating 40 is applied and the element is heated at about 700° C. for say 15 seconds thereby to effect a redistribution of the acceptors. After the initial heating at 800° C. as indicated in Fig. 15, in the converted shell portion, measured from the surface to the boundary at distance $X_i$ from the surface, the acceptor concentration $C_a$ is in excess of the donor concentration $C_d$, while in the inner portion the reverse is true. As a result of the second heating at 700° C. a redistribution of the acceptors is effected whereby, as portrayed in Fig. 16 all of the sphere is converted to P-type, i. e. $C_a$ exceeds $C_d$ throughout, but the excess of $C_a$ varies with radius of the sphere as shown.

What is claimed is:

The method of producing a germanium body having a PN junction therein which comprises applying a layer of silver to a surface portion of an N-type body, heating the layer and body to alloy the silver with the germanium, heating the body at a temperature in the conversion range between about 600° C. and 900° C. for a time to control to a desired depth the conversion to P conductivity type of the surface portion free of silver, said conversion progressing from the surface of the body toward the center of the body, and then quenching said body.

References Cited in the file of this patent

UNITED STATES PATENTS

| | | |
|---|---|---|
| 2,560,594 | Pearson | July 17, 1951 |
| 2,561,411 | Pfann | July 24, 1951 |
| 2,701,326 | Pfann et al. | Feb. 1, 1955 |

FOREIGN PATENTS

| | | |
|---|---|---|
| 632,980 | Great Britain | Dec. 5, 1949 |